United States Patent [19]

Suzuki

[11] 3,766,371

[45] Oct. 16, 1973

[54] BINARY FULL ADDER-SUBTRACTORS

[75] Inventor: Yasoji Suzuki, Kawasaki, Japan

[73] Assignee: Tokyo Shibaura Electric Co., Ltd., Kawasaki-shi, Japan

[22] Filed: July 27, 1971

[21] Appl. No.: 166,478

[30] Foreign Application Priority Data

July 31, 1970 Japan ............................ 45/66919

[52] U.S. Cl. ............................ 235/175, 235/173

[51] Int. Cl. ............................ G06f 7/385

[58] Field of Search .................. 235/175, 176, 168, 235/173

[56] References Cited

UNITED STATES PATENTS

| | | | |
|---|---|---|---|
| 3,602,705 | 8/1971 | Cricchi et al. | 235/175 |
| 3,100,838 | 8/1963 | Szekely | 235/176 |
| 3,201,574 | 8/1965 | Szekely | 235/176 X |
| 3,576,984 | 5/1971 | Gregg | 235/175 X |
| 3,609,329 | 9/1971 | Martin | 235/176 |

*Primary Examiner*—Malcolm A. Morrison
*Assistant Examiner*—James F. Gottman
*Attorney*—R. D. Flynn et al.

[57] ABSTRACT

A binary full adder-subtractor includes a first logic circuit which is supplied with binary digital signals respectively corresponding to an operand and an operator; a second logic unit which is supplied with the outputs of the first logic unit and a first carrying or borrowing signal of a preceding digit; and a gating circuit including AND gate circuits and OR gate circuits and which is supplied with binary digital signals respectively corresponding to the operand, the first carrying or borrowing signal, the output of the first logic unit and an operating signal for starting an addition or subtraction operation, to provide a second carrying or borrowing signal for a succeeding digit.

2 Claims, 7 Drawing Figures

BINARY FULL ADDER-SUBTRACTORS

The present invention relates to an improved binary adder-subtractor.

It has been known to fabricate a binary full adder-subtractor utilized to constitute an operating unit of a table type electronic computor, for example, as an integrated circuit by utilizing insulated gate field effect transistors. The insulated gate field effect transistor (IGFET) is also termed as a metal oxide semiconductor field effect transistor (MOSFET), but for the sake of description it is herein called merely as the field effect transistor (FET). The binary full adder-subtractor utilizing prior art field effect transistors requires a large number of FETs. Moreover, in order to fabricate the binary full adder-subtractor as an integrated circuit, the arrangement and interconnections between various FETs and connections between FETs and external circuits become extremely difficult, thus extremely complicating the circuit construction. In addition, in designing the integrated circuit, the layout of respective FETs becomes difficult, thus increasing the manufacturing cost and the physical size of the table type electronic computor.

Accordingly, it is an object of the invention to provide a new and improved binary full adder-subtractor of simple circuit construction, which requires only a small number of field effect transistors and hence can be readily fabricated as an integrated circuit of inexpensive and small size, thus consuming a small power.

SUMMARY OF THE INVENTION

According to this invention there is provided a binary full adder-subtractor comprising a first logic unit including a first exclusive logic circuit, a first coincidence circuit and a first inverter adapted to invert the outputs of the first exclusive logic circuit and the first coincidence circuit; the first logic circuit being supplied with binary digital signals respectively corresponding to an operand and an operator; a second logic unit including a second exclusive logic circuit and a second coincidence circuit; the second logic circuit being supplied with the outputs of the first logic unit and a first carrying or borrowing signal of a preceding digit; and a gating circuit including AND gate circuits and OR gate circuits; the gating circuit being supplied with binary digital signals respectively corresponding to the operand, the first carrying or borrowing signal, the output of the first logic unit and an operating signal for starting an addition or subtraction operation whereby to provide a second carrying or borrowing signal of a succeeding digit.

This invention can be more fully understood from the following detailed description when taken in connection with the accompanying drawings, in which.

In order to have better understanding of the invention the construction and operation of a conventional binary full adder-subtractor will first be described with reference to FIGS. 1 to 3 of the accompanying drawings. The binary full adder-subtractors presently available on the market and fabricated as integrated circuits are either of a type wherein the logic circuits comprise only P-channel FETs or a type wherein the logic circuits comprise complementary insulated gate field effect transistors (C-EG-FET) utilizing P- and N-channel type FETs. In the former type there are such drawbacks that the output is decreased by the so-called back gate bias and that it is necessary to use a very high source voltage. These drawbacks, however, can be obviated by the latter type.

Figure 1:
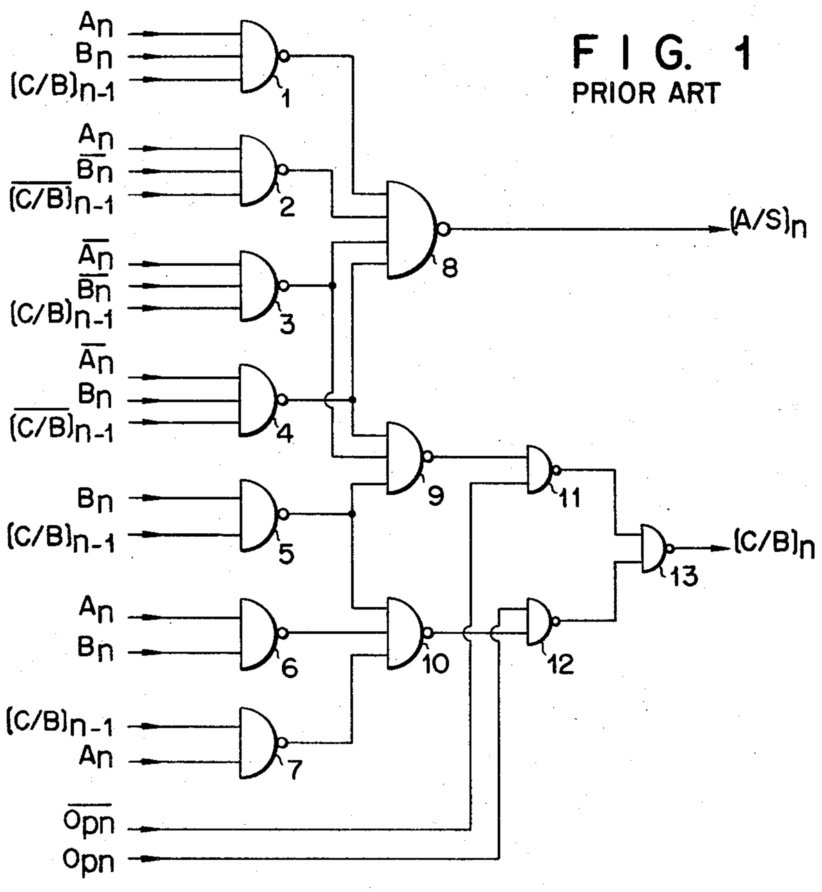
FIG. 1 PRIOR ART
FIG. 1 shows a block diagram of a conventional binary full adder-subtractor.
Figure 2:
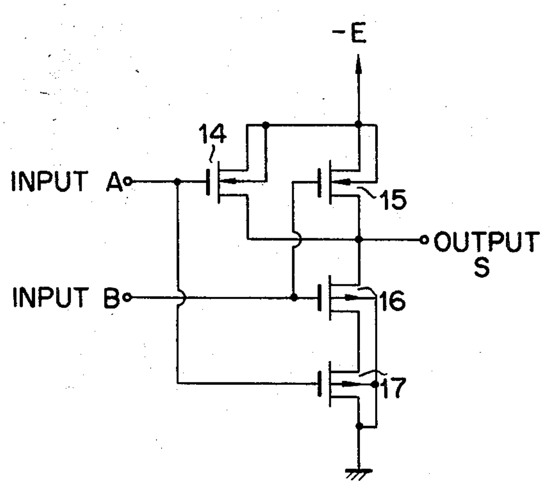
FIG. 2 PRIOR ART
FIGS. 2 and 3 illustrate connection diagrams of a conventional NOR-NAND gate circuit and a conventional NAND-NOR gate circuit, respectively.

Referring first to FIG. 1 illustrating a block diagram of a conventional binary full adder-subtractor, a symbol An designates a signal to be added or subtracted (operand signal) of the nth digit or order of magnitude, Bn an addent or subtrahend signal (an operator signal) of the nth digit or order of magnitude, $[C/B]n-1$ a carrying or a borrowing signal of a preceding digit of the nth digit or $(n-1)$th order of magnitude, $\overline{O}pn$ an operating signal for initiating the subtraction operation of the nth digit, $[A/S]n$ an answer of the addition or subtraction operation of the nth digit and $[C/B]n$ a carrying or a borrowing signal of the nth digit.

Where the NAND gate circuits 1 to 13 used in the circuit shown in FIG. 1 are composed of logic circuits as shown in FIGS. 2 (negative logic) and 3 (positive logic) it is necessary to connect in series or parallel at least four FETs 14 to 17 and 18 to 21 for each NAND gate circuit respectively as shown in these figures. For this reason, where a binary adder-subtractor circuit as shown in FIG. 1 is fabricated by using conventional C-FET logic circuits as shown in FIGS. 2 and 3, it is necessary to use a great many number, for example at least 62, of field effect transistors.

Figure 3:
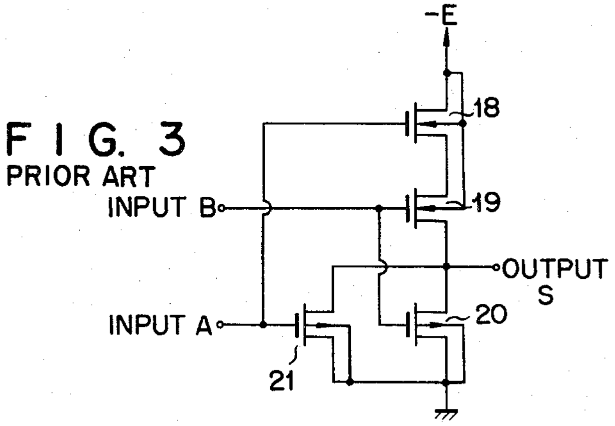

Furthermore, as can be clearly noted from FIGS. 2 and 3, since the N-channel type FETs 14, 15, 18, 19 and the P-channel type FETs 16, 17, 20, 21 are connected in series or parallel, where the logic circuits are fabricated as an integrated circuit the percentage of the area of the logic circuits of the substrate or chip of the integrated circuit will be increased, thus increasing the physical size of the integrated circuit. This not only renders difficult to realize a satisfactory layout of respective field effect transistors but also complicates the pattern of the arrangement of the FET elements as well as the manufacturing steps.

As above described, the invention contemplates the elimination of these drawbacks.

Figure 4:
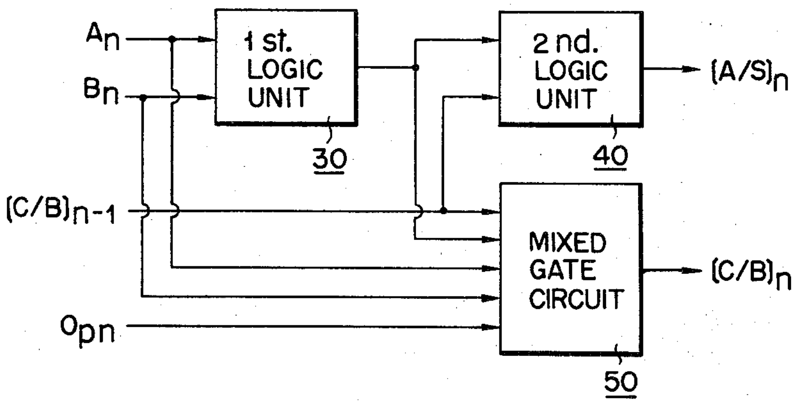
FIG. 4 shows a simplified block diagram of a binary full adder-subtractor of one embodiment of this invention.

Turning now to FIG. 4, a binary digital signal of the nth order or digit corresponding to a number or signal to be added or subtracted is applied to a first logic unit 30 and a mixed gate circuit 50 and an nth digit binary digital signal Bn corresponding to an addent or subtrahend is also supplied to the first logic unit 30 and the mixed gate circuit 50. The output from first logic unit 30 is supplied to a second logic unit 40 and to the mixed gate circuit 50 together with a carrying or borrowing signal $[C/B]n-1$ from the preceding or $(n-1)$th digit, and an answer output signal $[\overline{A/S}]n$ of the addition or subtraction operation of the second logic unit 40 is converted into an [A/S]$n$ signal by an inverter to be described later. Further, an operating signal $\overline{Op}n$ or Opn for addition or subtraction is supplied to mixed gate circuit 50 to produce a carrying or borrowing output signal $[\overline{C/B}]n$ as a result of the operation, which is converted into a [C/B]$n$ signal by the inverter to be described later. In this manner, the second logic unit 40 produces an answer of the binary full adder-subtractor whereas mixed gate circuit 50 produces a carrying or borrowing signal for the succeeding digit or ($n$+1)th digit.

Figure 5:
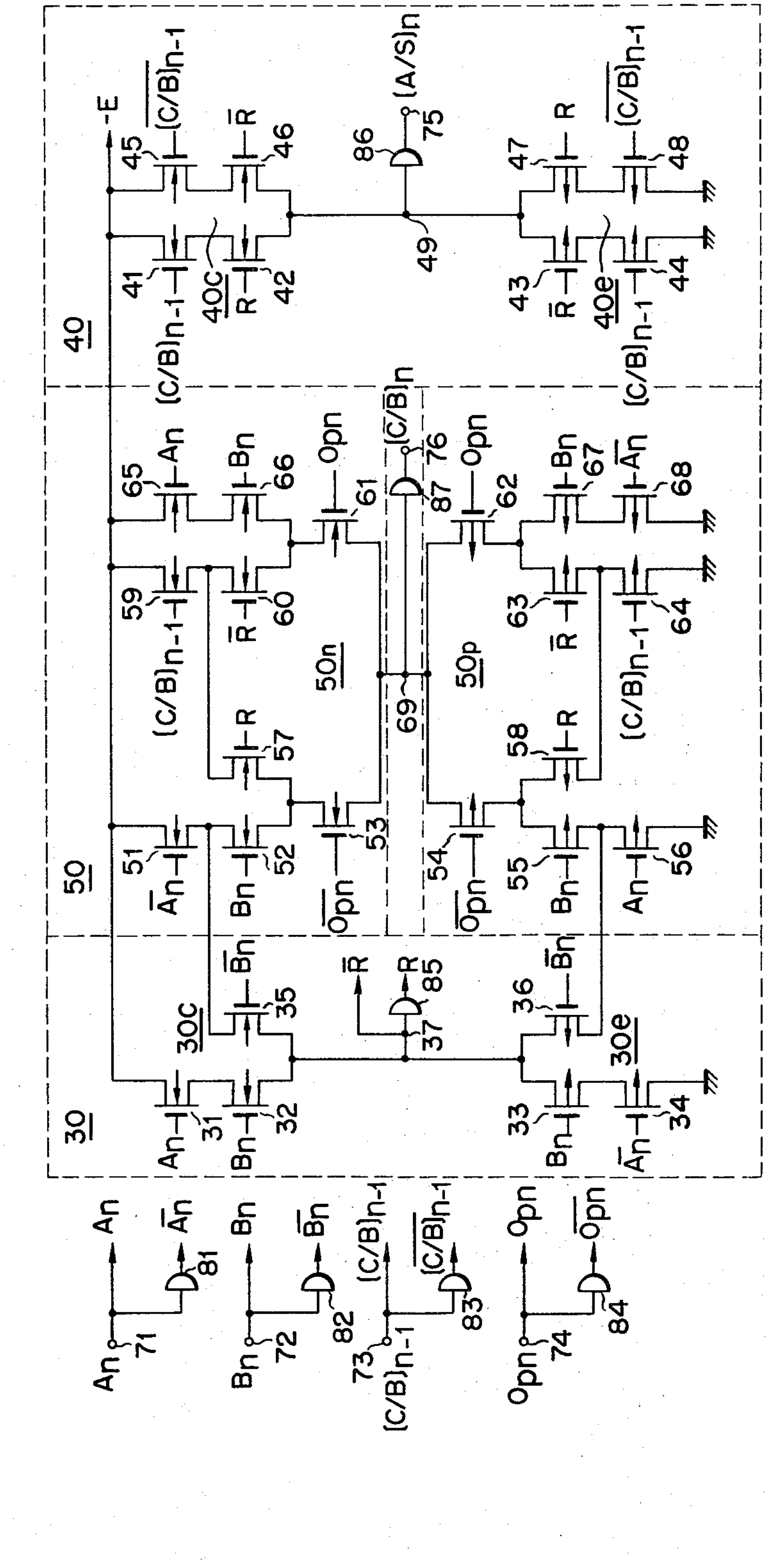
FIG. 5 shows a detailed block diagram of the binary full adder-subtractor shown in FIG. 4.

FIG. 5 shows a detailed connection of the circuit shown in FIG. 4. For the sake of description the drain electrode and the source electrode of the field effect transistor are herein defined as follows. More particularly, as the constructions of these electrodes are not appreciably different from the collector electrode and the emitter electrode of a bipolar element (e.g., a transistor) (excepting those for special purposes), in other words as the field effect transistor is a bidirectional element, the electrode on the source or output side is conventionally termed as the drain electrode while that on the ground side the source electrode. Such a conventional definition can be used for circuits using only the P-channel type FETs or the N-channel type FETs. In contrast, as the circuit dipicted is of the mixed type employing both P- and N-channel type FETs it is herein defined that the electrode on the output side as the drain electrode and that on the source side or ground side as the source electrode. The back gate electrodes of P-channel IGFET are grounded and the back gate electrodes of N-channel IGFET are connected to the bias power source −E.

As shown in FIG. 5, first logic unit 30 comprises a coincidence circuit 30$c$, an exclusive circuit 30$e$ and an inverter 85. The N-channel type FETs 31 and 32 of coincidence circuit 30$c$ and the P - channel type FETs 33 and 34 of the exclusive circuit 30$e$ are connected in series. A FET 51 of the gate circuit 50 to be described later, an N-channel type FET 35 and a P-channel type FET 36 of the unit 30 and a FET 56 of the gate circuit 50 are also connected in series and the juncture between FETs 32 and 33 and the juncture between FETs 35 and 36 are connected together to form an output terminal 37. The source electrode of FET 31 as above defined is connected to the negative terminal −E of a DC source and the drain electrode of FET 31 is connected to the source electrode of FET 32. The drain electrode of FET 32 is connected to the drain electrode of FET 33 and the source electrode of FET 33 is connected to the drain electrode of FET 34, the source electrode thereof being grounded. The source electrode of FET 51 is connected to the negative terminal −E while the drain electrode of FET 51 is connected to the source electrode of FET 35 with its drain electrode connected to the drain electrode of FET 36. The source electrode of FET 36 is connected to the drain electrode of FET 56, the source electrode thereof being grounded. The juncture between the drain electrodes of FETs 32 and 33 is connected to the juncture between the drain electrodes of FETs 35 and 36 which are connected to output terminal 37. the gate electrode of FET 31 is connected to an input terminal 71 which receives signals An to be operated whereas the gate electrode of FET 34 is connected to input terminal 71 via an inverter circuit 81, the output thereof acting as the inverted signal $\overline{An}$ of the signal to be operated An.

The gate electrodes of FETs 32 and 33 are connected to an input terminal upon which operator signal Bn is applied and the gate electrodes of FETs 35 and 36 are connected to input terminal 72 respectively through an inverter circuit 82, the output thereof acting as the inverted signal $\overline{Bn}$ of operator signal Bn. Output terminal 37 of the coincident circuit 30$c$ or exclusive circuit 30$e$ is connected to the output terminals of the second logic unit 40 and mixed gate circuit 50, directly and via inverter circuit 85, respectively. The output from the inverter circuit 85 constitutes an inverted signal $\overline{R}$ of the output signal R.

The second logic unit 40 comprises a coincidence circuit 40$c$, an exclusive circuit 40$e$ and an inverter 86. The N-channel type FETs 41 and 42 of the coincidence circuit 40$c$ and the P-channel type FETs 43 and 44 of the exclusive circuit 40$e$ are connected in series and the N-channel type FETs 45 and 46 and the P-channel type FETs 47 and 48 are also connected in series. The juncture between FETs 42 and 43 and the juncture between FETs 46 and 47 are commonly connected to an output terminal 49 which is connected through an inverter circuit 86 to an output terminal 75 to obtain an answer signal [A/S]$n$.

More particularly, the source electrode of FET 41 is connected to the negative terminal −E of the source and the drain electrode of FET 41 is connected to the source electrode of FET 42. The drain electrode of FET 42 is connected to the drain electrode of FET 43. The source electrode of FET 43 is connected to the drain electrode of FET 44 the source electrode thereof being grounded. The source electrode of FET 45 is connected to the −E terminal of the source and the drain electrode of FET 45 is connected to the source electrode of FET 46. The drain electrode of FET 46 is connected to the drain electrode of FET 47 whose source electrode is connected to the drain electrode of FET 48. The source electrode thereof is grounded. The juncture between the drain electrodes of FETs 42 and 43 and the juncture between the drain electrodes of FETs 46 and 47 are commonly connected to an output terminal 49. On the other hand the gate electrodes of FETs 41 and 42 are connected to an input terminal which receives a digit carrying or borrowing signal [C/B]$n$−1 from the previous digit. The gate electrodes of FETs 45 and 48 are connected to the input terminal 73 respectively through inverter circuit 83, the output thereof acting as the inverted signal $[\overline{C/B}]n-1$ of the carrying or borrowing signal [C/B]$n$−1. The gate electrodes of FETs 43 and 46 are connected to the output terminal 37 of the first logic circuit 30 and the gate electrodes of FETs 42 and 47 are connected to the output terminal of inverter circuit 85.

In the mixed gate circuit 50 which comprises sections 50$n$ (N-channel) and 50$p$ (P-channel), the N-channel type FETs 51, 52 and 53 and the P-channel type FETs 54, 55 and 56 are connected in series with each other. The N-channel type FETs 59 and 57, FETs 53 and 54 and the P-channel type FETs 58 and 64 are also connected in series. The juncture between FETs 52 and 53 is connected to the drain electrode of the FET 57. Likewise the juncture between FETs 54 and 55 is connected to the drain electrode of the FET 58. Furthermore the N-channel type FET 59, the N-channel type FETs 60 and 61 are connected in series and the P-channel type FETs 62, 63 and 64 are also connected in series. Similarly, the N-channel type FETs 65 and 66, FET 61 are connected in series and the P-channel FETs 62, 67 and 68 are also connected in series. The juncture between FETs 60 and 61 is connected to the drain electrode of FET 66. Further, the juncture between FETs 62 and 63 is also connected to the drain electrode of FET 67. The juncture between FETs 53 and 54 and that between FETs 61 and 62 are commonly connected to an output terminal 69 which is connected through an inverter circuit 87 to an output terminal 76 to obtain a carrying or borrowing signal [C/B]*n* as a result of the operation.

More particularly, the source electrode of FET 51 is connected to −E terminal of the source and the drain electrode of FET 51 is connected to the source electrode of FET 52. The drain electrode of FET 52 is connected to the source electrode of FET 53 whose drain electrode is connected to the drain electrode of FET 54. The source electrode of FET 54 is connected to the drain electrode of FET 55 with its source electrode connected to the drain electrode of FET 56, the source electrode thereof being grounded. Similarly, the source electrode of FET 59 is connected to −E terminal of the source and the drain electrode of FET 59 is connected to the source electrode of FET 57 whose drain electrode is connected to the source electrode of FET 53. The drain electrode of FET 53 is connected to the drain electrode of FET 54 while the source electrode of FET 54 is connected to the drain electrode of FET 58 whose source electrode is connected to the drain electrode of FET 64 with its source electrode grounded. The juncture between the drain electrode of FET 52 and the source electrode of FET 53 is interconnected with the juncture between the drain electrode of FET 57 and the source electrode of FET 53. Similarly, the juncture between the source electrode of FET 54 and the drain electrode of FET is connected to the juncture between the source electrode of FET 54 and the drain electrode of FET 58. The source electrode of FET 59 is connected to −E terminal of the source and the drain electrode of FET 59 is connected to the source electrode of FET 60 whose drain electrode is connected to the source electrode of FET 61. The drain electrode of FET 61 is connected to the drain electrode of FET 62 with its source electrode connected to the drain electrode of FET 63. The source electrode of FET 63 is connected to the drain electrode of FET 64 whose source electrode is grounded. The source electrode of FET 65 is connected to the −E terminal of the source while the drain electrode of FET 65 is connected to the source electrode of FET 66. The drain electrode of FET 66 is connected to the source electrode of FET 61 while the drain electrode thereof is connected to the drain electrode of FET 62. The source electrode of FET 62 is connected to the drain electrode of FET 67 whose source electrode is connected to the drain electrode of FET 68. Both gate electrodes of FETs 56 and 65 are connected to input terminal 71 whereas both gate electrodes of FETs 51 and 68 are connected to the output terminal of inverter circuit 81. Respective gate electrodes of FETs 52, 55, 66 and 67 are connected to the input terminal 72 and the gate electrodes of FETs 59 and 64 are connected to input terminal 73. Both gate electrodes of FETs 61 and 62 are connected to input terminal 74 which is connected to receive an operation command signal Opn. Respective gate electrodes of FETs 53 and 54 are connected to input terminal 74 through inverter circuit 84. The output signal from inverter circuit 84 acts as the inverted signal $\overline{\mathrm{O}}$pn of the operation command signal. The gate electrodes of FETs 60 and 63 are respectively connected to the output terminal 37 of the first logic unit 30 whereas the gate electrodes of FETs 57 and 58 are respectively connected to the output terminal of inverter circuit 85.

In the above description, although the substrate electrode of each FET was not described it should be understood that a suitable bias voltage is impressed upon the substrate electrode for stabilizing the operation of the field effect transistor. Thus, for example, the substrate electrode of each N-channel type FET is connected to the −E terminal of the source and that of each P-channel type FET is grounded. Certain of the field effect transistors have been dipicted in duplicate, this means that a single FET is used in common. Thus, it will be clear that identical elements may be added if desired.

Figure 6:
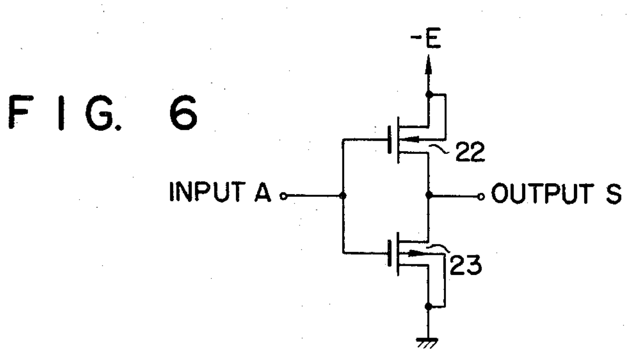
FIG. 6 is a connection diagram of the inverter shown in FIG. 5.

Each one of inverters 81, 82, 83, 84, 85, 86 and 87 is of the compementary FET logic circuit comprising an N-channel type FET 22 and a P-channel type FET 23, as shown in FIG. 6.

Logical equations of the binary full adder-subtractor illustrated in FIG. 5 are as follows. Considering a positive logic, the output $\overline{\mathrm{R}}$ at the output terminal 37 of the first logic unit 30 corresponds to an OR output of the output from the coincidence circuit 30*c* and the output from the exclusive circuit 30*e*, thus $$\overline{\mathrm{R}} = \mathrm{AnBn} + \overline{\mathrm{A}}\mathrm{n}\overline{\mathrm{B}}\mathrm{n} \ldots\ldots \quad (1)$$

Consequently, the output from inverter 85 corresponds to the inverted output of $\overline{\mathrm{R}}$.

Output $[\overline{\mathrm{C}}/\overline{\mathrm{B}}]n$ at the output terminal 69 of mixed gate circuit 50 corresponds to an OR output of the output from a section or unit comprising N-channel FETs and an output from a section or unit comprising a P-channel type FETs thus $$[\overline{\mathrm{C}}/\overline{\mathrm{B}}]n = \overline{\mathrm{O}}\mathrm{pn}(\overline{\mathrm{A}}\mathrm{nBn} + [\mathrm{C/B}]n{-}1\ \overline{\mathrm{R}}) + \mathrm{Opn}([\mathrm{C/B}]n{-}1\ \mathrm{R} + \mathrm{AnBn}) \ldots\ldots \quad (2)$$

Thus, the carrying or borrowing output [C/B]*n* of the mixed gate circuit 50 is an inverted signal of output $[\overline{\mathrm{C}}/\overline{\mathrm{B}}]n$.

Output $[\overline{\mathrm{A}}/\overline{\mathrm{S}}]n$ at terminal 49 of the second logic unit 40 corresponds to the OR output of the output from coincidence circuit 40 and the output from exclusive circuit 40*e*. Thus, $$[\overline{\mathrm{A}}/\overline{\mathrm{S}}] = [\mathrm{C/B}]n{-}1\ \mathrm{R} + [\overline{\mathrm{C}}/\overline{\mathrm{B}}]n{-}1\ \overline{\mathrm{R}} \ldots\ldots \quad (3)$$

In this manner, the answer of the full adder-subtractor of this embodiment is expressed by a signal obtained by inverting the output $[\overline{\mathrm{A}}/\overline{\mathrm{S}}]n$ by means of inverter circuit 86.

The addition and subtraction operations of the embodiment shown in FIG. 5 will now be considered by using equations (1), (2) and (3) and the following truth value table 1 of the binary full adder-subtractor. In table 1, when the operating signal Opn is expressed by an "1" addition operation is performed whereas when signal Opn is expressed by "0" or $\overline{\mathrm{O}}$pn, substraction operation is performed.

TABLE 1

| A*n* | B*n* | C*n*−1 | Opn | [A/S]*n* | [C/B]*n* |
|---|---|---|---|---|---|
| 0 | 0 | 0 | 1 | 0 | 0 |
| 1 | 0 | 0 | 1 | 1 | 0 |
| 0 | 1 | 0 | 1 | 1 | 0 |
| 1 | 1 | 0 | 1 | 0 | 1 |
| 0 | 0 | 1 | 1 | 1 | 0 |

| | | | | | |
|---|---|---|---|---|---|
| 1 | 0 | 1 | 1 | 0 | 1 |
| 0 | 1 | 1 | 1 | 0 | 1 |
| 1 | 1 | 1 | 1 | 1 | 1 |
| 0 | 0 | 0 | 0 | 0 | 0 |
| 1 | 0 | 0 | 0 | 1 | 0 |
| 0 | 1 | 0 | 0 | 1 | 1 |
| 1 | 1 | 0 | 0 | 0 | 0 |
| 0 | 0 | 1 | 0 | 1 | 1 |
| 1 | 0 | 1 | 0 | 0 | 0 |
| 0 | 1 | 1 | 0 | 0 | 1 |
| 1 | 1 | 1 | 0 | 1 | 1 |

Supposing now that input signals of the logical data are supplied to respective input terminals 71 to 74, following operations are performed. More particularly, where the operand signal An is at a "0" level, operator signal Bn is at a 0 level, carrying or borrowing signal [C/B]$n$−1 is at a 0 level and operation command signal Opn is at a "1" level (addition), in other words, when signals of 0 levels are supplied to input terminals 71, 72 and 73 and when a signal of a 1 level is supplied to input terminal 74, FETs 33, 35, 42, 43, 44, 45, 51, 54, 55, 56, 57, 61, 63, 64 and 67 become conductive respectively whereas other FETs become non-conductive. As a result, the answer signal [A/S]$n$ provided at output terminal 75 as the result of operation assumes a 0 level and the carrying or borrowing signal [C/B]$n$ provided at output terminal 76 also assumes a 0 level.

In other words, since An equals 0 and Bn is also 0, in equation (1), $\overline{R}$ assumes a 0 and R a 1. Further, since Opn equals 1 and [C/B]$n$−1 equals 0, in equation (2), [$\overline{C}/\overline{B}$]$n$ assumes a 1, hence [C/B]$n$ a 0. Further, in equation (3) [$\overline{A}/\overline{S}$]$n$ assumes a 1 and hence the answer a 0. Since the addition operation is performed only when An, Bn and [C/B]$n$−1 are 0 and only Opn is 1, both [A/S]$n$ and [C/B]$n$ assume 0. This shows that the operation of the circuit well coincides with equations (1) to (3) and table 1.

Where the operand signal An assumes a 1 level, operator signal Bn a 0 level, carrying or borrowing signal [C/B]$n$−1 a 0 level and operation command signal Opn a 1 level, in other words, where signals of 1 level are applied to input terminals 71 and 74 and signals of 0 level are applied to input terminals 72 and 73, 33, 34, 35, 44, 45, 46, 47, 54, 55, 58, 60, 61, 64, 65, 67 and 68 become conductive respectively whereas other FETs non-conductive. Consequently, signal [A/S]$n$ appearing at output terminal 75 will assume a 1 level and signsl [C/B]$n$ at output terminal a 0 level.

In this manner, since An equals a 1 and Bn equals a 0, in equation (1), $\overline{R}$ assumes a 1 and R a 0. Furthermore, since [C/B]$n$−1 equals a 0 and Opn a 1, in equation (2), [$\overline{C}/\overline{B}$]$n$ assumes a 1 and [C/B]$n$ a 0, and in equation (3) [$\overline{A}/\overline{S}$]$n$ Assumes a 0 and hence the answer of addition operation [A/S]$n$ assumes a 1. Since the addition operation is performed when both An and Opn are 1 and Bn and [C/B]$n$−1 are 0 in table 1, the answer of the addition operation [A/S]$n$ will be a 1 and the carrying or borrowing output [C/B]$n$ will be a 0. This means that the operation of the circuit well coincides with equations (1) to (3) and table 1.

As the novel circuit constitues a complementary FET logic, where N-channel type FETs of logic circuits 30, 40 and 50 become conductive, capacitors, not shown, connected between output terminals 37, 49 and 69 and the ground will be charged such that the potentials of output terminals 37, 49 and 69 will become negative. These charged capacitors are discharged when P-channel type FETs become conductive and are then charged in the opposite direction thus applying the ground potential to output terminals 37, 49 and 69. In this manner, by using the complementary FET logic, currents flow through FETs only during the transient periods whereby it is possible to greatly reduce the power consumption.

Where An, Bn, [C/B]$n$−1 and Opn equal 1 respectively FETs 31, 32, 33, 41, 42, 44, 47, 52, 55, 56, 57, 58, 59, 61, 62, 64, 65, 66 and 67 will become conductive, respectively. As a result, in FIG. 5, $\overline{R}$ becomes a 0 [$\overline{C}/\overline{B}$]$n$ a 0 and [$\overline{A}/\overline{S}$] a 0. In this manner, the carrying output [C/B]$n$ of the full adder-subtractor becomes a 1 and the answer of the addition operation [A/S]$n$ also becomes a 1. Where these results are confirmed by equations (1), (2) and (3), equation (1) shows that $\overline{R}$ equals a 0, equation (2) shows that [C/B]$n$ equals a 0 and equation (3) shows that [$\overline{A}/\overline{S}$]$n$ equals a 0. These results also coincide with table 1.

Subtraction operations, that is, other combinations of input signals including the case of $\overline{\text{Op}}$n are also performed in the same manner. Thus, the circuit shown in FIG. 5 can perform the addition and subtraction operations shown in the truth table 1. Although above described operations relate to the positive logic wherein −E was assumed to represent the 0 level and 0 V the 1 level, it will be clear that the negative logic also holds true by reversing the levels.

Thus, it will be clear that the invention provides a novel full adder-subtractor that can operate in the same manner as the prior art full adder-subtractor circuit but with a quite different circuit construction from that using gate circuits. Moreover, it is possible to greatly reduce the number of circuit elements, *i.g.* FETs, to only 46 in the illustrated example which is lesser by 12 than the prior art circuit shown in FIG. 1. This not only simplifies the circuit construction, but also makes possible to fabricate the circuit as an integrated circuit.

Further, since the circuit does not contain any DC passage, the power consumption is limited to only the power due to the transient currents that flow at the time of switching respective FETs and to the leakage currents at the PN junctions of the FETs. Furthermore as all inputs are comprised by insulated gate circuits, the input impedances are extremely high so that the output voltage levels with respect to the input are greatly stabilized.

For this reason by applying the novel circuit to an operation circuit of a table type electronic computor or an electronic computor for the general purpose it is not only possible to reduce the number of circuit elements but also possible to fabricate the circuit as an integrated circuit thus reducing the physical size of the computor. Power consumption is also small.

Since the circuit is a ratioless circuit, it is possible to make uniform the transmission conductance of the element. This also contributes to the miniaturization of the integrated circuits and to the improvement of the operating speed.

Figure 7:
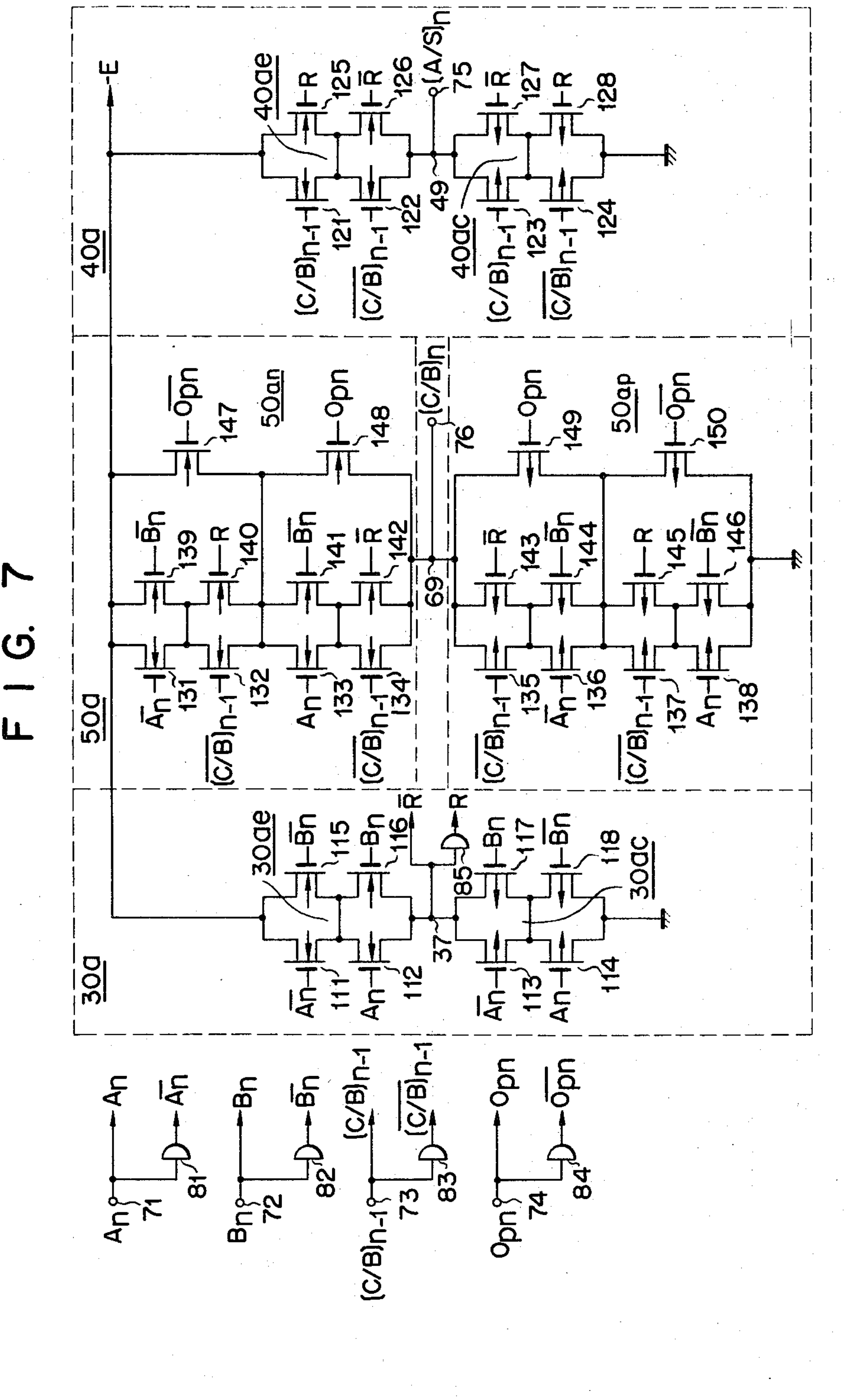
FIG. 7 shows a block diagram of a modified embodiment of the full adder-subtractor embodying the invention.

FIG. 7 shows a modified embodiment of the invention in which component parts identical to those shown in FIG. 5 are designated by the same reference characters. The first logic circuit **30*a* comprises a noncoincidence circuit 30*ae*, a coincidence circuit 30*ac* and an inverter 85. The N-channel type FETs 111 and 112 of the noncoincidence circuit 30*ae* and the P-channel type FETs 113 and 114 of the coincidence circuit 30*ac* are connected in series across −E terminal of the source and the ground. The N-channel type FETs 115** and 116 of the noncoincidence circuit 30*ae* and the P-channel type FETs 117 and 118 of the coincidence circuit 30*ac* are also connected in series. Junctures between corresponding FETs of both series circuits are mutually interconnected and the juncture between FETs 112 and 113 and that between FETs 116 and 117 are connected to an output terminal 37. The gate electrodes of FETs 112 and 114 are connected to input terminal 71, respectively, whereas the gate electrodes of FETs 111 and 113 are connected to the output terminal of the inverter circuit 81. The gate electrodes of FETs 116 and 117 are connected to input terminal 72 while the gate electrodes of FETs 115 and 118 are connected to the output terminal of the inverter circuit 82.

The second logic unit 40*a* comprises noncoincidence circuit 40*ae* and coincidence circuit 40*ac* wherein N-channel type FETs 121 and 122 and P-channel type FETs 123 and 124 are connected in series between −E terminal and the ground, and N-channel type FETs 125 and 126 and P-channel type FETs 127 and 128 are also connected in series. Junctures between corresponding FETs of these series circuits are interconnected. The juncture between FETs 122 and 123 and that between FETs 126 and 127 are connected to terminal 49 which is connected to output terminal 75. The gate electrodes of FETs 121 and 123 are connected to input terminals 73 and the gate electrodes of FETs 122 and 124 are connected to the output terminal of inverter circuit 83. The gate electrodes of FETs 126 and 127 are connected to the output terminal 37 of the first logic unit 30′ and the gate electrodes of FETs 125 and 128 are connected to the output terminal of the inverter circuit 85.

The mixed gate circuit 50*a* comprises sections 50*an* (N-channel) and 50*ap* (P-channel) is identical to that shown in FIG. 5 except that inverter 87 has been omitted. N-channel type FETs 131, 132, 133 and 134 and P-channel type FETs 135, 136, 137 and 138 are connected in series and N-channel type FETs 139, 140, 141 and 142 and P-channel type FETs 143, 144, 145 and 146 are also connected in series. Junctures between corresponding FETs of these two series circuits are interconnected. The juncture between FETs 134 and 135 and that between FETs 142 and 143 are connected to output terminal 69 which is connected to output terminal 75. An N-channel FET 147 is connected in parallel with a series circuit including FETs 139 and 140 and N-channel FET 148 is connected in parallel with a series circuit including FETs 141 and 142. A P-channel type FET 149 is connected in parallel with a series circuit including FETs 143 and 144 and a P-channel type FET 150 is connected in parallel with a series circuit including FETs 145 and 146. The gate electrodes of FETs 133 and 138 are connected to input terminal 71 and the gate electrodes of FETs 131 and 136 are connected to the output terminal of the inverter circuit 81. Similarly the gate electrodes of FETs 139, 141, 144 and 146 are connected to the output terminal of the inverter circuit 82 and the gate electrodes of FETs 132, 134, 135 and 137 are connected to the output terminal of the inverter circuit 83. Furthermore, the gate electrodes of FETs 142 and 143 are respectively connected to the output terminal 37 of the first logic unit 30′ and the gate electrodes of FETs 140 and 145 are connected to the output terminal of the inverter circuit 85. The gate electrodes of FETs 139, 141, 144 and 146 are respectively connected to the output terminal of the inverter 82. Likewise, the gate electrodes of FETs 148 and 149 are connected to the input terminal 74 and the gate electrodes of FETs 147 and 150 are connected to the output terminal of the inverter 84. The operation of this modified embodiment is similar to that of the first embodiment.

Equations for logical operations of the modified embodiment shown in FIG. 7 are as follows: First, it is assumed that the output $\overline{R}$ appearing at the terminal 37 of the first logic unit 30*a* is a positive logic. Then this output corresponds to an OR output of the output of the exclusive circuit 30*ae* and the output of the coincidence circuit 30*ac*. Thus $$\overline{R} = (\overline{A}n + \overline{B}n)\,(An + Bn) \ldots\ldots \quad (4)$$

The output $[\overline{C}/\overline{B}]n$ produced at the terminal 69 of mixed gate circuit 50*a* corresponds to an OR output of the output from a section or unit 50*an* comprised by the N-channel type FETs and the output from a section or unit (50*ap*) comprised by P-channel type FETs. Consequently, the equation related to the actual addition and subtraction operations is expressed by $$[\overline{C}/\overline{B}]n = \{(\overline{A}n + \overline{B}n)\,([\overline{C}/\overline{B}]n{-}1 + R) + \overline{O}pn\}\,\{(An + \overline{B}n)\,([\overline{C}/\overline{B}]n{-}1 + \overline{R}) + Opn\} \ldots\ldots \quad (5)$$

The output $[\overline{A}/\overline{S}]$ at the terminal 49 of the second logic unit 40*a* is expressed by $$[A/S]n = ([C/B]n{-}1 + R)\,([C/B]n{-}1 + \overline{R}) \ldots\ldots \quad (6)$$

For example, where An, Bn and Opn assume a 1 level respectively and $[C/B]n{-}1$ a 0 level, FETs 112, 116, 113 and 118 of the first logic unit become conductive so that $\overline{R}$ equals a 1. In the mixed gate circuit 50, FETs 140, 145, 146, 148 and 149 become conductive so that output $[\overline{C}/\overline{B}]n$ will become equal to a 1. In the second logic unit 40*a*, FETs 122, 123, 125 and 127 become conductive so that the output $[A/S]n$ will become equal to a 1. This means that these results coincide with equations (4), (5) and (6) and table 1.

Again, for various combinations of input signals, it was confirmed that the results of operations well coincide with equations (4), (5) and (6) as well as table 1. Thus, the modified embodiment shown in FIG. 7 also operates as a satisfactory binary full adder-subtractor.

For the sake of clearness of the drawing, although not shown in FIGS. 5 and 7 it is to be understood that the back gate or substrate of each N-channel FET is connected to the −E terminal of the source and the substrate of each P-channel FET is grounded for the purpose of preventing rupturing of FETs.

Although in the embodiments described above a minus DC source was used it is clear that a positive DC source can also be used with equal results. In the latter case, however, P-channel type FETs and N-channel type FETs must be interchanged.

What is claimed is:

1. A binary full adder-subtractor comprising:

a first logic unit (30) including a first exclusive OR circuit (30*e*), a first coincidence circuit (30*c*) and a first inverter (85) adapted to invert the outputs of said first exclusive OR circuit (30*e*) and said coincidence circuit (30*c*), said first exclusive OR circuit (30*e*) being supplied with binary digital signals ($\overline{A}$n,Bn) respectively corresponding to an operand and an operator;

a second logic unit (40) including a second exclusive OR circuit (40*e*) and a second coincidence circuit (40*c*), said second exclusive OR circuit (40*e*) being supplied with the outputs (R,$\bar{R}$) of said first logic unit (30) and a first carrying or borrowing signal of a logic unit operating on a preceding digit; and a gate circuit (50) including an N-channel type field effect transistor logic unit (50*n*) having a first AND gate circuit including three serially connected N-channel type field effect transistors (51,52,53), said first AND gate circuit operating to produce an AND output of an operator signal (Bn), an inverted operand signal ($\bar{A}$n) and an inverted operating signal ($\overline{Opn}$); a second AND gate circuit including three serially connected N-channel type field effect transistors (53,57,59), said second AND gate circuit operating to produce an AND output of said first carrying or borrowing signals ([C/B]$n$−1), the output (R) of said first exclusive OR circuit (30*e*) and an inverted operating signal ($\overline{Opn}$), a third AND gate circuit including three serially connected N-channel type field effect transistors (59,60,61), said third AND gate circuit operating to produce an AND output of said first carrying or borrowing signal ([C/B]$n$−1), an inverted output ($\bar{R}$) of said first logic unit (30) and said operating signal (Opn), a fourth AND gate circuit including three serially connected N-channel type field effect transistors (61,65,66), said fourth AND gate circuit operating to produce an AND output of said operand signal (An), said operator signal (Bn) and said operating signal (Opn), an N-channel type field effect transistor logic unit having a first OR gate circuit including a first juncture of drains of field effect transistors (52,57) adapted to produce an OR output of the outputs of said first and second AND gate circuits, a second OR gate circuit including a second juncture of drains of field effect transistors (60,66) adapted to produce an OR output of said third and fourth AND gate circuits and a third OR gate circuit including a third juncture of drains of field effect transistors (53,61) adapted to produce an OR output of the outputs of said first and second OR gate circuits, a complementary logic unit (50*p*) for said N-channel type field effect transistor logic unit (50*n*), said complementary logic unit (50*p*) being of similar construction to said N-channel type field effect transistor logic unit (50*n*) but having P-channel type field effect transistors, a fourth OR gate circuit including a fourth juncture (69) adapted to produce an OR output of said N-channel type field effect transistor logic unit (50*n*) and said P-channel type field effect transistor logic unit (50*p*), and an inverter (82) for inverting the output of said fourth OR gate circuit.

2. A binary full adder-subtractor comprising:

a first logic unit (30*a*) including a first exclusive OR circuit (30*ae*), a first coincidence circuit (30*ac*) and a first inverter (85) adapted to invert the outputs of said first exclusive OR circuit (30*ae*) and said first coincidence circuit (30*ae*), said first exclusive OR circuit (30*ae*) being supplied with binary digital signals respectively corresponding to an operand and an operator (An,Bn);

a second logic unit (40*a*) including a second exclusive OR circuit (40*ae*) and a second coincidence circuit (40*ac*)to provide an answer signal ([A/S]$n$) through an output terminal (75), said second exclusive OR circuit (40*e*) being supplied with the outputs (R) of said first logic unit (30*a*) and a first carrying or borrowing signal ([C/B]$n$−1) of a logic unit operating on a preceding digit;

a gate circuit (50*a*) including an N-channel type field effect transistor logic unit (50*an*) having a first AND gate circuit comprised of field effect transistors (147,133,134) adapted to provide an AND output of an inverted operating signal ($\overline{Opn}$), an operator signal (An), and an inverted first carrying or borrowing signal ([C/B]$n$−1), a second AND gate circuit comprised of field effect transistors (147,141,142) adapted to provide an AND output of an inverted operating signal ($\overline{Opn}$), an inverted operator signal ($\bar{B}$n) and an inverted output ($\bar{R}$) of said first logic unit (30*a*), a third AND gate circuit comprised of field effect transistors (147,133,142) adapted to provide an AND output of an inverted operating signal ($\overline{Opn}$), an operand signal (An), and an inverted output ($\bar{R}$) of said first logic unit (30*a*), an fourth AND gate circuit comprised of field effect transistors (147,141,134) adapted to provide an AND output of an inverted operating signal ($\overline{Opn}$), an inverted operator signal ($\bar{B}$n) and an inverted first carrying or borrowing signal ([C/B]$n$−1), a fifth AND gate circuit comprised of field effect transistors (131,132), adapted to provide an AND output of an inverted operand signal ($\bar{A}$n) and an inverted first carrying or borrowing signal ([C/B]$n$−1), a sixth AND circuit comprised of field effect transistors (131,140) adapted to provide an AND output of an inverted operand signal ($\bar{A}$n) and an output (R) of said first logic unit (30*a*), a seventh AND gate circuit comprised of field effect transistors (139,132) adapted to provide an AND output of an inverted operator signal ($\bar{B}$n) and an inverted first carrying or borrowing signal ([C/B]$n$−1) and an eighth AND gate circuit comprised of field effect transistors (139,140) adapted to provide an AND output of an inverted operator signal ($\bar{B}$n) and an output (R) of said first logic unit (30*a*), said AND outputs of said fifth, sixth, seventh and eighth AND gate circuits being provided for said operating signal (Opn); and a complementary logic unit (50*ap*) of similar construction to said N-channel field effect transistor logic unit (50*an*) but including P-channel type field effect transistors and acting as a complementary unit for said N-channel field effect transistor logic unit, (50*an*), and a fifth OR gate circuit including a juncture (69) adapted to provide an OR output of the output of said N-channel type field effect transistor logic unit (50*an*) and the output of said P-channel type field effect transistor complementary logic unit (50*ap*).

* * * * *